United States Patent [19]

Campbell, III et al.

[11] Patent Number: 5,511,412

[45] Date of Patent: Apr. 30, 1996

[54] METHOD OF DIAGNOSING AN IDLE SPEED CONTROL SYSTEM

[75] Inventors: Samuel Campbell, III, Southfield; Kenneth J. Wenzel, Farmington Hills, both of Mich.

[73] Assignee: Chrysler Corporation, Auburn Hills, Mich.

[21] Appl. No.: 238,097

[22] Filed: May 4, 1994

[51] Int. Cl.$^6$ .......................... G01M 15/00; F02D 41/16; F02M 3/00; F02B 23/00
[52] U.S. Cl. ...................................... 73/117.3; 73/118.1
[58] Field of Search .................................. 73/115, 117.3, 73/118.1, 118.2, 116, 117.2

[56] References Cited

U.S. PATENT DOCUMENTS

| | | | |
|---|---|---|---|
| 4,809,541 | 3/1989 | Alway et al. | 73/118.1 |
| 4,903,657 | 2/1990 | Miyazaki et al. | 73/115 |
| 5,050,427 | 9/1991 | Cote et al. | 73/118.1 |
| 5,065,721 | 11/1991 | Wiggins et al. | 73/118.1 |
| 5,083,541 | 1/1992 | Chen | 123/339 |
| 5,113,827 | 5/1992 | Vincent | 123/417 |
| 5,117,682 | 6/1992 | Amano | 73/118.1 |
| 5,124,919 | 6/1992 | Kastelle | 73/118.1 |
| 5,207,091 | 5/1993 | Shibata et al. | 73/117.3 |
| 5,235,946 | 8/1993 | Fodale et al. | 123/339 |
| 5,345,384 | 9/1994 | Przybyla et al. | 73/118.1 |
| 5,363,027 | 11/1994 | Noguchi | 73/118.1 |
| 5,408,871 | 4/1995 | Lieder et al. | 73/118.1 |
| 5,414,645 | 5/1995 | Hirano | 364/551.01 |
| 5,419,186 | 5/1995 | Janetzke et al. | 73/118.1 |
| 5,429,091 | 7/1995 | Huber et al. | 123/399 |

*Primary Examiner*—Richard Chilcot
*Assistant Examiner*—George M. Dombroske
*Attorney, Agent, or Firm*—Mark P. Calcaterra

[57] ABSTRACT

A method of diagnosing an idle speed control system for an internal combustion engine in an automotive vehicle includes the steps of determining whether a plurality of conditions are met for the idle speed control system, ending the method if the predetermined conditions are not met for the idle speed control system, determining whether a difference between an engine speed and a target idle speed is greater than a predetermined threshold value if the predetermined conditions are met for the idle speed control system, and concluding that the idle speed control system is functioning properly if the difference is not greater than the predetermined threshold value.

20 Claims, 3 Drawing Sheets

METHOD OF DIAGNOSING AN IDLE SPEED CONTROL SYSTEM

BACKGROUND OF THE INVENTION

1. Field of the Invention

The present invention relates generally to idle speed control systems for internal combustion engines in automotive vehicles and, more particularly, to a method of diagnosing an idle speed control system for an internal combustion engine in an automotive vehicle.

2. Description of the Related Art

It is known to provide an internal combustion engine of an automotive vehicle with an idle speed control system. Typically, the idle speed control system has an Automatic Idle Speed (AIS) motor which controls the amount of idle air in a throttle body of the internal combustion engine. Typically, the idle speed control system is diagnosed by checking for an open or short in a circuit of the AIS motor.

One disadvantage of the above diagnostic routine is that the AIS motor can loose control although the circuit to the AIS motor is closed. Another disadvantage of the above diagnostic routine is that only an electrical problem is diagnosed.

SUMMARY OF THE INVENTION

It is, therefore, one object of the present invention to provide a method of diagnosing an idle speed control system for an internal combustion engine in an automotive vehicle.

It is another object of the present invention to provide a method of diagnosing an idle speed control system which diagnoses other than an electrical problem.

To achieve the foregoing objects, the present invention is a method of diagnosing an idle speed control system for an internal combustion engine in an automotive vehicle including the steps of determining whether a plurality of predetermined conditions are met for the idle speed control system, ending the method if the predetermined conditions are not met for the idle speed control system, determining whether a difference between an engine speed and a target idle speed is greater than a predetermined threshold value if the predetermined conditions are met for the idle speed control system, and concluding that the idle speed control system is functioning properly if the difference is not greater than the predetermined threshold value.

One advantage of the present invention is that a method is provided for diagnosing an idle speed control system for an internal combustion engine in an automotive vehicle. Another advantage of the present invention is that the method of diagnosing the idle speed control system has the capability to diagnose the idle speed control system for problems other than electrical. Yet another advantage of the present invention is that the method of diagnosing the idle speed control system evaluates the speed of the engine at idle to make sure that the idle speed control system is functioning properly.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
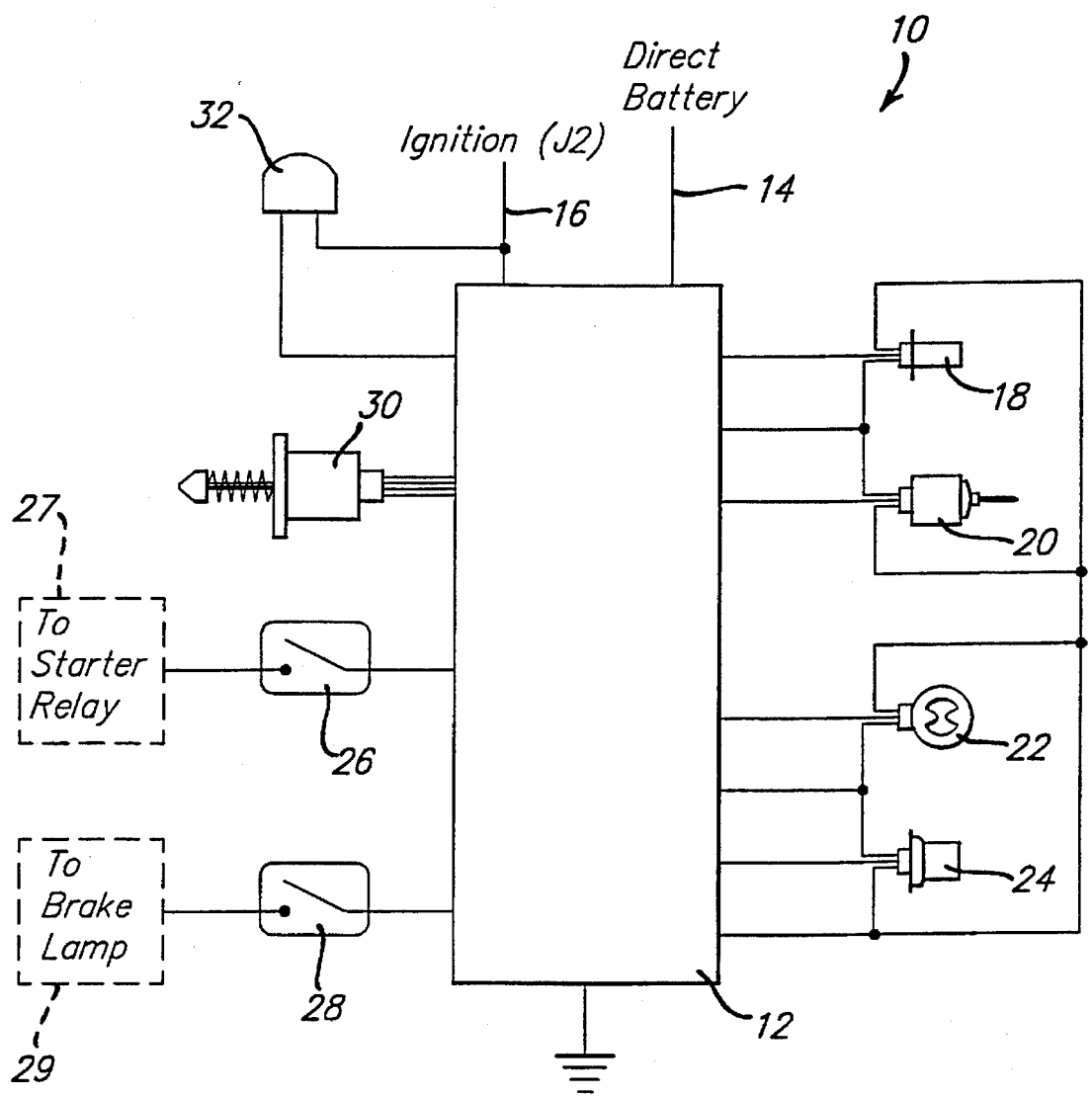
FIG. 1 is a schematic diagram of an idle speed control system which is diagnosed according to the present invention.

Referring to FIG. 1, an idle speed control system 10 is illustrated schematically for an internal combustion engine (not shown) in an automotive vehicle (not shown). The system 10 includes a powertrain control module or engine controller 12 receiving power inputs 14 and 16 from a vehicle battery (not shown) and ignition of the engine for the vehicle. It should be appreciated that the engine controller 12 is conventional and known in the art.

The system 10 also includes a crank sensor 18 for sensing a speed of the engine and a vehicle speed sensor 20 for sensing a speed of the vehicle. The system 10 includes a throttle position sensor 22 for sensing an angular position of a throttle (not shown) of the engine and a manifold absolute pressure (MAP) sensor 24 for sensing MAP of the engine. The sensors 18, 20, 22 and 24 are connected to the engine controller 12 which receives their inputs. It should be appreciated that the sensors 18, 20, 22 and 24 are conventional and known in the art.

The system 10 further includes a Park/Neutral switch 26 interconnecting a starter relay 27 of the engine and the engine controller 12 for sensing whether a transmission (not shown) of the vehicle is in a Park or Neutral state. The system 10 includes a brake switch 28 interconnecting a brake lamp 29 of the vehicle and the engine controller 12 for sensing whether brakes (not shown) of the vehicle are being applied. The system 10 also includes an Automatic Idle Speed (AIS) motor 30 connected to a throttle body (not shown) of the engine and the engine controller 12 for controlling idle air past the throttle in the throttle body of the engine. The system 10 includes a malfunction indicator lamp 32 connected to the power input 16 and the engine controller 12 to notify a vehicle operator of a malfunction of the system 10. It should be appreciated that the AIS motor 30 is of a stepper type and is conventional and known in the art.

Figure 2A:
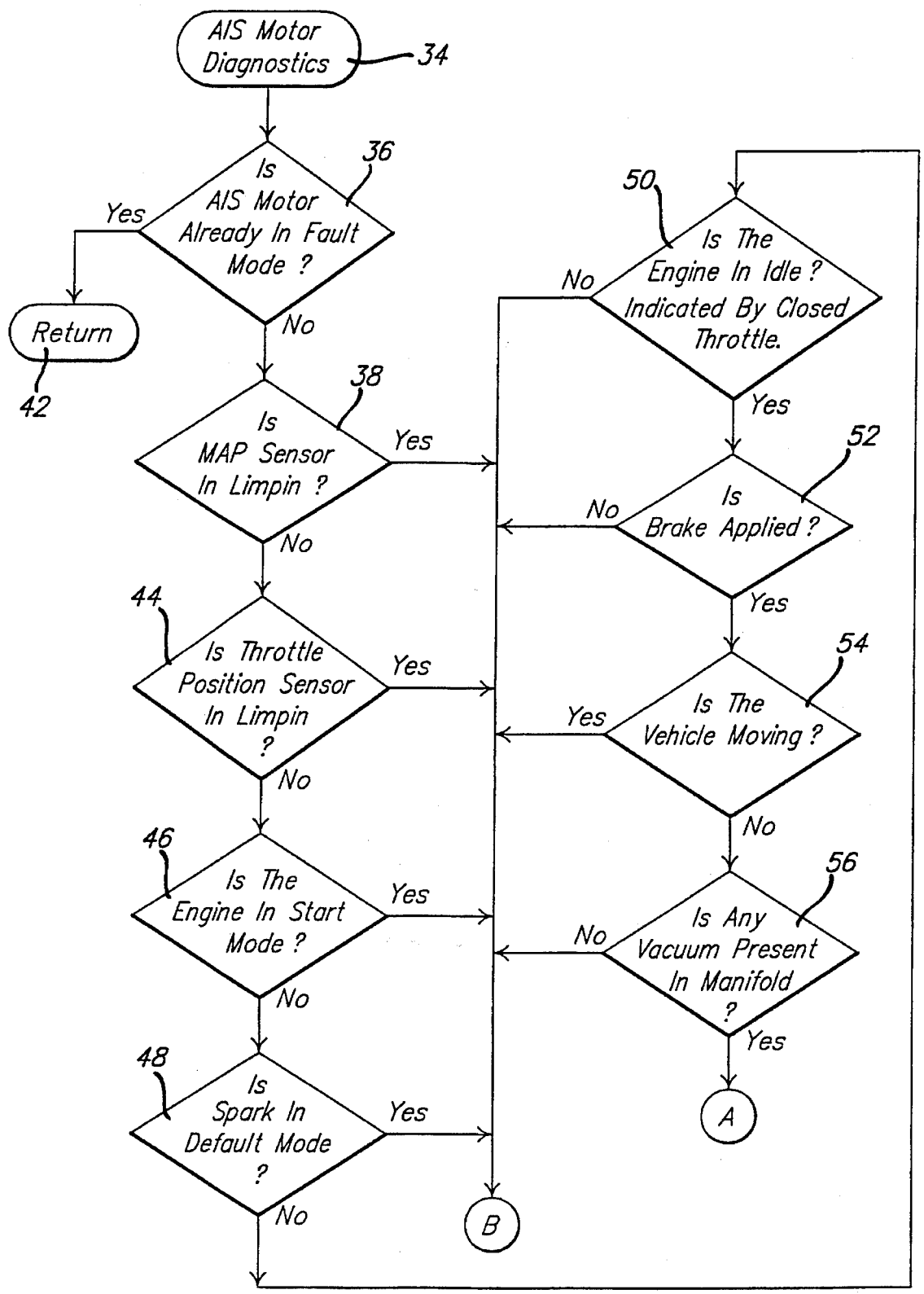
FIG. 2A and 2B are flowcharts of a method, according to the present invention, of diagnosing the idle speed control system of FIG. 1.
Figure 2B:
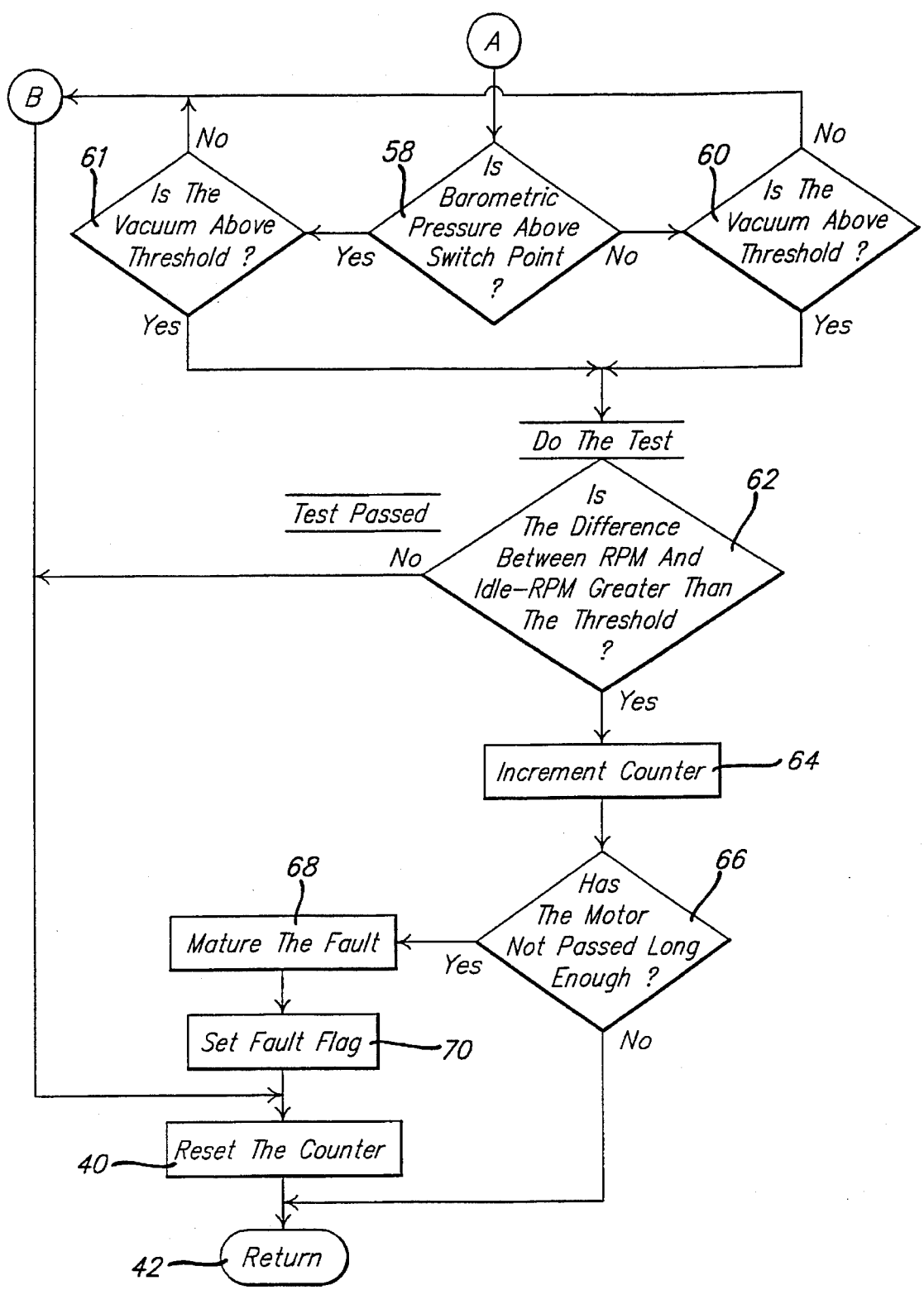

Referring to FIGS. 2A and 2B, a method of diagnosing the idle speed control system 10 is shown. The method evaluates the engine speed at idle to make sure that the system 10 is functioning properly. In FIG. 2A, the methodology begins in bubble 34 and advances to diamond 36. In diamond 36, the methodology determines whether the AIS motor 30 is fault set or a default mode, for example, by looking for a flag. If so, the methodology advances to bubble 38 and returns. If not, the methodology advances to diamond 38 and determines whether the MAP sensor 24 is in limpin or a limphome mode of operation, for example, by looking for a flag. If so, the methodology advances to block 40 and resets a test-failed counter (not shown) in the engine controller 12. After block 40, the methodology advances to bubble 42 and returns.

In diamond 38, if the MAP sensor 24 is not in limpin, the methodology advances to diamond 44 and determines whether the throttle position sensor 22 is in limpin, for example, by looking for a flag. If so, the methodology advances to block 40 previously described. It should be appreciated that since the MAP and throttle position sensors 24 and 22 are used to evaluate the rest of the control conditions, the method cannot proceed unless the two sensors are functioning properly.

In diamond 44, if the throttle position sensor 22 is not in limpin, the methodology advances to diamond 46 and determines whether the engine is in a start mode, for example, by looking for a flag. If so, the methodology advances to block 40 previously described. If not, the methodology advances to diamond 48 and determines whether a spark control of the engine is in a default start mode, for example, by looking for a flag. If so, the methodology advances to block 40 previously described.

In diamond 48, if the spark control is not in a default start mode, the methodology advances to diamond 50 and determines whether the engine indicates closed throttle for an idle condition, for example, by looking for a flag. If not, the methodology advances to block 40 previously described. It should be appreciated that the AIS motor 30 will not be functioning unless the engine has entered the closed throttle mode.

In diamond 50, if the engine is in idle indicated by closed throttle, the methodology advances to diamond 52 and determines whether the brake is applied, for example, by looking for a flag. If not, the methodology advances to block 40 previously described. If so, the methodology advances to diamond 54 and determines whether the vehicle is moving. The engine controller 12 compares the vehicle speed from the vehicle speed sensor 20 to a predetermined value such as zero (0). If the vehicle speed is greater than zero, the methodology advances to block 40 previously described.

If the vehicle speed is not greater than zero, the methodology advances to diamond 56 and determines whether any vacuum is present in a manifold (not shown) of the engine. This vacuum is calculated by the engine controller 12 by taking the difference between the barometric pressure and MAP from the MAP sensor 24 and comparing it to a predetermined value such as zero (0). If the difference is not greater than zero, the methodology advances to block 40 previously described. If the difference is greater than zero, the methodology advances to diamond 58 and determines whether the barometric pressure is above a predetermined barometric pressure switch point such as seven hundred torr (700t). If not, the methodology advances to diamond 60 and determines whether the vacuum is above a first predetermined threshold such as three torr (3t). If not, the methodology advances to block 40 previously described. If so, the methodology advances to diamond 62 to be described.

In diamond 58, if the barometric pressure is above the predetermined barometric pressure switch point, the methodology advances to diamond 61 and determines whether the vacuum is above a second predetermined threshold such as ninety-seven torr (97t). If not, the methodology advances to block 40 previously described. If so, the methodology advances to diamond 62 to be described.

In diamond 62, the methodology determines whether the difference between the actual engine speed and a target idle speed (Idle-RPM) is greater than a predetermined threshold such as two hundred (200) RPM. The engine controller 12 compares the engine speed from the crank sensor 18 to the target idle speed. If the difference between these two values is not greater than the predetermined threshold, the methodology concludes that the system 10 has passed the test and must be functioning properly to maintain the target idle speed. The methodology then advances to block 40 previously described. If the difference between these two values is greater than the predetermined threshold, the methodology advances to block 64 and increments an indicator or counter by a predetermined value such as one (1). Since this counter is cleared every time the system 10 passes the test and whenever all the control conditions are not present, the counter represents the length of time that the system 10 has not passed the diagnostics.

After block 64, the methodology advances to diamond 66 and determines whether the AIS motor 30 has not passed long enough, for example, by looking for a count on the counter being greater than a predetermined time representing 11.6 seconds. If not, the methodology advances to bubble 42 and returns. If so, the methodology advances to block 68 and matures the fault by setting a fault code associated with the system 10. The methodology then advances to block 70 and sets the fault flag. The methodology then advances to block 40 and returns. It should be appreciated that the setting of the fault flag will force the malfunction indicator lamp 32 to turn ON and notify the vehicle operator of a malfunction of the system 10.

Accordingly, the method evaluates the engine speed at idle to make sure the system 10 is functioning properly. The method is performed only after several predetermined conditions have been met. The method concludes that the system 10 must be functioning normally when the engine speed is within a small variation from the target idle speed. Otherwise, a fault with the system 10 is recorded.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of diagnosing an idle speed control system for an internal combustion engine in an automotive vehicle, said method comprising the steps of:

determining whether a plurality of predetermined conditions are met for the idle speed control system;

ending the method if the predetermined conditions are not met for the idle speed control system;

determining whether a difference between an engine speed and a target idle speed is greater than a predetermined threshold value if the predetermined conditions are met for the idle speed control system; and concluding that the idle speed control system is functioning properly if the difference is not greater than the predetermined threshold value.

2. A method as set forth in claim 1 wherein said step of determining the predetermined conditions includes determining whether an Automotive Idle Speed (AIS) motor of the idle speed control system fault has been indicated.

3. A method as set forth in claim 1 wherein said step of determining the predetermined conditions includes determining whether a MAP sensor of the idle speed control system is in a limpin mode.

4. A method as set forth in claim 1 wherein said step of determining the predetermined conditions includes determining whether a throttle position sensor of the idle speed control system is in a limpin mode.

5. A method as set forth in claim 1 wherein said step of determining the predetermined conditions includes determining whether the engine is in start mode.

6. A method as set forth in claim 1 wherein said step of determining the predetermined conditions includes determining whether a spark control is in a default spark mode.

7. A method as set forth in claim 1 wherein said step of determining the predetermined conditions includes determining whether the engine is in idle.

8. A method as set forth in claim 1 wherein said step of determining the predetermined conditions includes determining whether a brake of the vehicle is applied.

9. A method as set forth in claim 1 wherein said step of determining the predetermined conditions includes determining whether the vehicle is moving.

10. A method as set forth in claim 1 wherein said step of determining the predetermined conditions includes determining whether any vacuum is present in a manifold of the engine.

11. A method as set forth in claim 1 wherein said step of determining the predetermined conditions comprises determining whether a barometric pressure is greater than a predetermined barometric pressure switch point and determining whether a vacuum of the engine is greater than a first or second predetermined threshold based on the barometric pressure being greater or less than the predetermined barometric pressure switch point.

12. A method as set forth in claim 1 wherein said step of ending comprises resetting an indicator.

13. A method as set forth in claim 1 including the step of incrementing an indicator if the difference is greater than the predetermined threshold.

14. A method as set forth in claim 13 including the step of determining if the indicator is greater than a predetermined value.

15. A method as set forth in claim 14 including the step of maturing a fault and setting a fault indicator if the indicator is greater than the predetermined value.

16. A method of diagnosing an idle speed control system for an internal combustion engine in an automotive vehicle, said method comprising the steps of:

determining whether an Automotive Idle Speed (AIS) motor of the idle speed control system indicates fault;

determining whether a MAP sensor of the idle speed control system is in a limpin mode if the AIS motor fault indicator has not been set;

determining whether a throttle position sensor of the idle speed control system is in a limpin mode if the MAP sensor is not in a limpin mode;

ending the method if the AIS motor fault is set, MAP sensor or throttle position sensor are in the limpin mode;

determining whether a difference between an engine speed and a target idle speed is greater than a predetermined threshold value if the throttle position sensor is not in the limpin mode; and concluding that the idle speed control system is functioning properly if the difference is not greater than the predetermined threshold value.

17. A method as set forth in claim 16 including the step of determining whether the engine is in a start mode prior to said step of determining the difference;

determining whether a spark control is in a default start mode if the engine is not in a start mode;

determining whether the engine is in idle if the spark control is not in a default mode;

determining whether a brake of the vehicle is applied if the engine is in idle;

determining whether the vehicle is moving if the brake is applied; and ending the method if the engine is in a start mode or the spark control is in a default spark mode or the engine is not in idle or the brake is not applied or the vehicle is moving.

18. A method as set forth in claim 17 including the step of determining whether any vacuum is present in a manifold of the engine if the vehicle is not moving; and determining whether a barometric pressure is greater than a predetermined barometric pressure switch point if there is any vacuum present in the manifold and determining whether a vacuum of the engine is greater than a first or second predetermined threshold based on the barometric pressure being greater or less than the predetermined barometric pressure switch point.

19. A method as set forth in claim 16 including the step of incrementing an indicator if the difference is greater than the predetermined threshold;

determining if the indicator is greater than a predetermined value; and maturing a fault and setting a fault indicator if the indicator is greater than the predetermined value.

20. A method of diagnosing an idle speed control system for an internal combustion engine in an automotive vehicle, said method comprising the steps of:

determining whether an Automotive Idle Speed (AIS) motor of the idle speed control system has indicated fault;

determining whether a MAP sensor of the idle speed control system is in a limpin mode if the AIS motor has not set a fault;

determining whether a throttle position sensor of the idle speed control system is in a limpin mode if the MAP sensor is not in the limpin mode;

determining whether the engine is in a start mode if the throttle position sensor is not in the limpin mode;

determining whether a spark control is in a default start mode if the engine is in the start mode;

determining whether the engine is in idle if the spark control is in a default mode;

determining whether a brake of the vehicle is applied if the engine is in idle;

determining whether the vehicle is moving if the brake is applied;

determining whether any vacuum is present in a manifold of the engine if the vehicle is not moving;

determining whether a barometric pressure is greater than a predetermined barometric switch point and determining whether a vacuum of the engine is greater than a first or second predetermined threshold if the barometric pressure is greater or less than the predetermined barometric pressure switch point;

determining whether a difference between an engine speed and a target idle speed is greater than a predetermined threshold value if the predetermined conditions are met for the idle speed control system;

concluding that the idle speed control system is functioning properly if the difference is not greater than the predetermined threshold value;

incrementing an indicator if the difference is greater than the predetermined threshold;

determining if the indicator is greater than a predetermined value; and maturing a fault and setting a fault indicator if the indicator is greater than the predetermined value.

* * * * *